(12) United States Patent
Yee et al.

(10) Patent No.: US 6,847,300 B2
(45) Date of Patent: Jan. 25, 2005

(54) ELECTRIC POWER METER INCLUDING A TEMPERATURE SENSOR AND CONTROLLER

(75) Inventors: David Moon Yee, Scottsdale, AZ (US); Philip John Zucarelli, Glendale, AZ (US); Theodore Woolley Keller, Scottsdale, AZ (US); David Richard Wallis, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 472 days.

(21) Appl. No.: 10/051,721

(22) Filed: Jan. 17, 2002

(65) Prior Publication Data

US 2002/0105435 A1 Aug. 8, 2002

Related U.S. Application Data

(60) Provisional application No. 60/265,960, filed on Feb. 2, 2001.

(51) Int. Cl.[7] ................................................. G01V 3/00
(52) U.S. Cl. ............. 340/584; 340/870.02; 340/870.17; 307/117; 361/103
(58) Field of Search ................................ 340/584, 588, 340/870.02, 870.17; 361/37, 103; 307/117

(56) References Cited

U.S. PATENT DOCUMENTS

| | | | | |
|---|---|---|---|---|
| 4,191,868 A | * | 3/1980 | Sunde | 200/61.5 |
| 4,360,338 A | * | 11/1982 | Katchka | 431/46 |
| 4,470,711 A | | 9/1984 | Brzozowski | |
| 4,505,530 A | | 3/1985 | Fennel | |
| 4,615,113 A | | 10/1986 | Fennel | |
| 4,698,655 A | | 10/1987 | Schultz | |
| 5,668,538 A | * | 9/1997 | Warwick | 340/870.02 |
| 5,986,574 A | | 11/1999 | Colton | |
| 6,177,884 B1 | * | 1/2001 | Hunt et al. | 340/870.02 |
| 6,300,881 B1 | | 10/2001 | Yee et al. | |
| 6,429,777 B1 | * | 8/2002 | Boyden | 340/584 |
| 6,653,945 B2 | * | 11/2003 | Johnson et al. | 340/870.02 |
| 6,705,340 B1 | * | 3/2004 | McGill et al. | 137/315.06 |

* cited by examiner

Primary Examiner—Albert K. Wong
(74) Attorney, Agent, or Firm—Steven R. Santema; Valerie M. Davis (57) ABSTRACT

An electric power meter (102) includes a temperature sensor (114) and a controller (112). The controller (112) is operable, based on the temperature reported from the temperature sensor (114), to generate alarm(s) when the temperature exceeds certain alarm threshold(s) (307, 507, 508) and to activate a power disconnect switch (104), thereby shutting off power to a customer premises, when the temperature exceeds a shut off threshold (309, 509). The controller (112) is operable to activate the power disconnect switch (104) for non-payment of electricity cost, subject to secondary criteria based on regulatory requirements. A customer terminal (103) may be used to notify a customer of an alarm condition, to provide information regarding electrical power usage or to provide information regarding disconnection of electrical power.

14 Claims, 5 Drawing Sheets

ELECTRIC POWER METER INCLUDING A TEMPERATURE SENSOR AND CONTROLLER

This application claims benefit of 60/265,960 filed Feb. 2, 2001.

FIELD OF THE INVENTION

This invention relates generally to electric power meters and more particularly to an electric power meter that contains a temperature sensor and a controller.

BACKGROUND OF THE INVENTION

Electric power meters are well known devices used by utility service providers for measuring the amount of electrical power consumed by a residential or industrial customer. At the lower end of complexity, power meters consist simply of a power measurement apparatus for measuring power consumption and a gauge that is visible on the outside of the power meter for showing the amount of electrical power consumed. Customers are billed by the utility companies based on periodic readings of the electric power meter, indicating electrical power already used. More recently, prepayment utility metering systems have become known in which the customer pays for the electricity at the electric power meter in advance, before it is used. Oftentimes, in prepayment systems, power can be disconnected from the customer residence if the customer doesn't pay for the electricity in advance. It would be desirable for purposes of customer safety and compliance with regulatory authorities (such as state utility commissions and city governments) that electrical power meters do not cause service to be disconnected for certain customers during the winter months or when the outside temperature is within a certain range.

Further, as with any electric device, an electric power meter generates heat as it operates. This heat can affect the reliability of the power measurement apparatus within the electric power meter and occasionally, can cause fires resulting in damage to the customer premises and injury or death to persons. Clearly, customer health and safety would be enhanced by reducing the likelihood of electrical fires.

Accordingly, there is a need for an improved electric power meter that enhances public safety and complies with applicable regulatory requirements. Advantageously, the power meter will improve the accuracy of power measurements, reduce instances of fire and, if used in a prepayment system, will not cause electrical service to be disconnected during winter month or at proscribed temperatures. The present invention is directed to satisfying or at least partially satisfying these needs.

BRIEF DESCRIPTION OF THE DRAWINGS

The foregoing and other advantages of the invention will become apparent upon reading the following detailed description and upon reference to the drawings in which.

DESCRIPTION OF A PREFERRED EMBODIMENT

Figure 1:
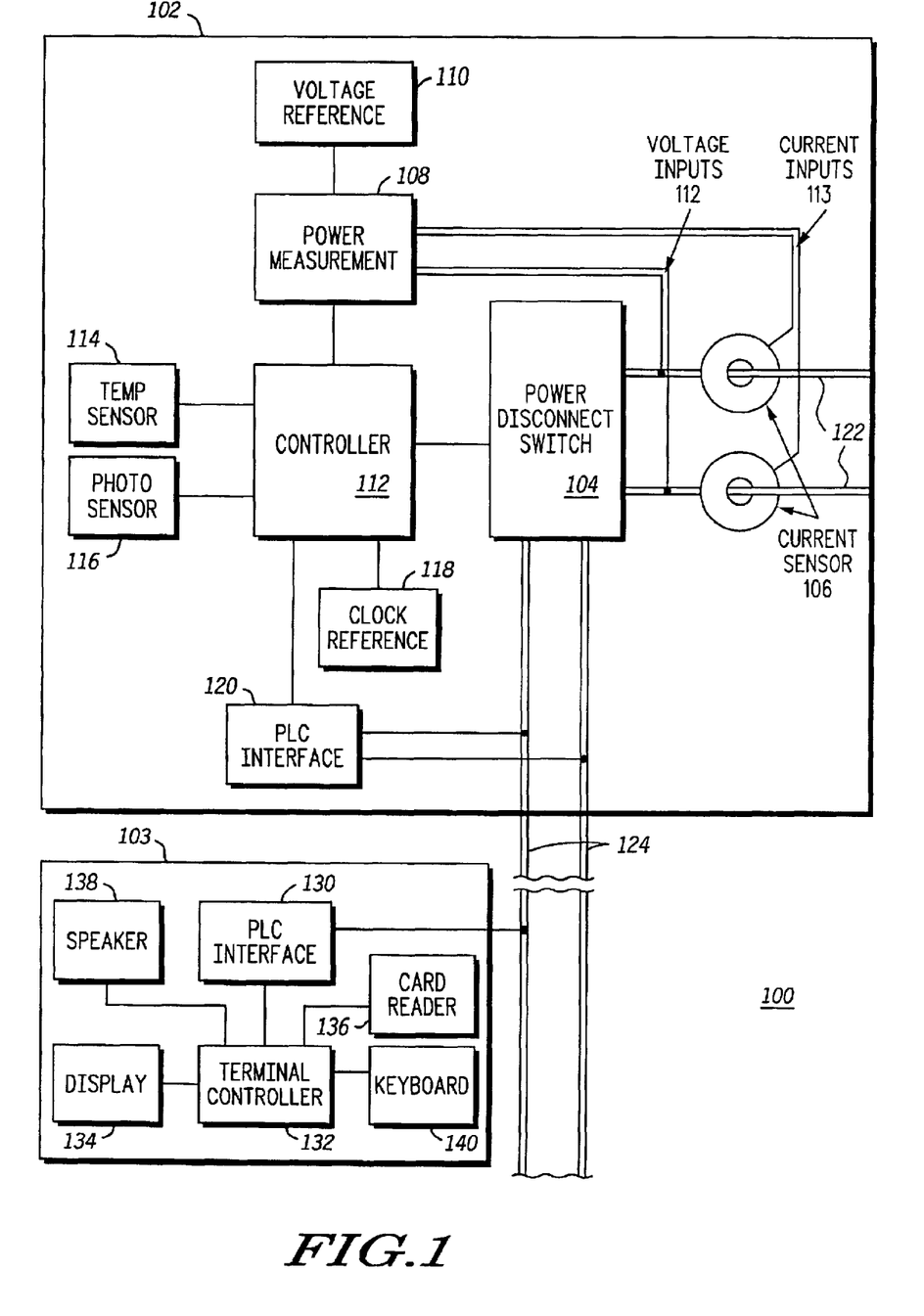
FIG. 1 is a block diagram of an electric energy metering system according to one embodiment of the present invention.

FIG. 1 illustrates an electric energy metering system 100 according to the present invention. The electric energy metering system 100 is adapted to measure the amount of electrical energy used within a customer premises such as a house, apartment, commercial building or factory. Further, according to principles of the present invention, the electric energy metering system is adapted to shut off power when temperature conditions dictate to reduce the likelihood of fires; and to comply with regulatory rules when disconnecting power for non-payment of energy charges. Generally, the electric energy metering system 100 comprises an electric metering device ("power meter") 102 and a customer terminal 103. Typically, the power meter 102 is installed exterior to the customer premises and the customer terminal 103 is within the customer premises.

The power meter 102 measures the amount of electrical power being used by a customer. In one embodiment, the power meter 102 comprises a power disconnect switch 104, two current sensors 106, a power measurement device 108, a voltage reference 110, a controller 112, a temperature sensor 114, a photo sensor 116, a clock reference 118, and a power line carrier (PLC) interface 120. Electrical power enters the power meter 102 on two input wires 122 and exits the power meter on two output wires 124 which lead into the customer premises (not shown).

As is well known, residential electric power distribution in the United States and numerous other countries uses a three-wire system. The three-wire system uses a common ground wire and two "hot" wires. A sinusoidal voltage with respect to the ground wire is placed on the two hot wires. In the illustrated embodiment, the two input wires 122 (and two output wires 124) represent the two hot wires of the residential power distribution system, and the ground wire (not shown) of the residential power distribution system does not enter the power meter 102.

The power disconnect switch 104 is connected to the two input wires 122 and the two output wires 124. Under commands from the controller 112, the power disconnect switch 104 either enables electric current to flow through the meter (i.e., by maintaining an electrical connection between the two input wires 122 and two output wires 124) or it disconnects the two input wires 122 from the two output wires 124 to cut off electric current flowing through the meter and hence, to disconnect the customer premises from electrical power.

The current sensors 106 monitor the electrical current entering the power meter on the two input wires 122. In one embodiment, the current sensors 106 comprise toroidal current transformers. Toroidal current transformers are available from a number of manufacturers such as, for example, Siemens. The current sensors 106 provide a measurement of the rate-of-change of electrical current (di/dt) on the two input wires 122 to a power measurement device 108. The power measurement device 108 is also connected directly to the two input wires 122 to measure the voltage across the two input wires 122 by comparing it to a voltage reference 110. In one embodiment, the power measurement device 108 comprises an integrated circuit, such as commercially available from Analog Devices. The voltage reference 110 is a diode with a temperature compensation circuit that outputs a constant reference voltage.

The power measurement device 108 outputs a sinusoidal signal to the controller 112 that has a frequency proportional to the power passing through the electric metering device. The temperature sensor 114 measures the temperature within the power meter 102. The measured temperature is effected by the heat generated within the device (as may be contributed by the current flowing in the two input wires 122, the power disconnect switch 104, and the two output wires 124) as well as heat external to the power meter, such as from a socket (not shown) into which the meter 102 may be installed and/or ambient temperature outside of the meter. The temperature sensor 114 is a device that is available from a number of manufacturers such as Dallas Semiconductor. Temperature data is sent from the temperature sensor 114 to the controller 112.

The photo sensor 116 detects the light level outside of the power meter 102 and provides a signal to the controller 112. In one embodiment, the photo sensor 116 is a photo diode. In one embodiment, presuming the power meter 102 is not obstructed from light, the photo sensor 116 can determine whether it is day or night and so notify the controller 112. As will be appreciated, the photo sensor 116 could be mounted remotely from the power meter 102 if the power meter is obstructed from light.

The PLC interface 120 provides for power line signaling over the output power lines 124 of the power meter 102. The PLC interface 120 modulates data onto the output power lines 124 so that it can be sent from the power meter 102 to devices within the customer premises. The PLC interface 120 also demodulates data from the output power lines 124 that is being sent from devices within the customer premises to the power meter 102. In one embodiment, the PLC interface 120 is a commercially available device that complies with the American National Standards Institute (ANSI) EIA 709.2 power line communication standard.

In one embodiment, the clock reference 118 is a dual mode real-time clock. In a first mode, the clock reference 118 uses a 60 Hz sinusoidal signal present on the input wires 122 to keep track of time. In a second mode, the clock reference 118 uses an internal crystal oscillator to provide a time reference when the sinusoidal signal is not present on the input wires 122 such as during a electrical power outage. The clock reference 118 contains an internal battery to power the crystal oscillator when electrical power is not available.

As shown, the controller 112 is connected to the power measurement device 108, temperature sensor 114, photo sensor 116, PLC interface 120, power disconnect switch 104 and clock reference 118. In one embodiment, the controller 112 is a microprocessor that is capable of performing actions based on input data according to preprogrammed instructions. These actions can include, for example, tracking electrical power usage, monitoring temperature, operating the power disconnect switch 104, tracking payment for electrical power, conducting communication with other devices using the PLC interface 120 and tracking the date and/or time of day.

As will be appreciated by those skilled in the art, many other variations on the power meter 102 are possible. For example, the power meter 102 may be constructed without one or more of the components shown in FIG. 1 such as the photo sensor 116, voltage reference 110, PLC interface 120, etc. One or more of the components of the power meter 102 such as the controller 112, clock reference 118, disconnect switch 104, etc may reside within the same integrated circuit. The power meter 102 may use alternative method(s) of determining current flow other than the current sensors 106.

The power meter 102 might also include additional components. For example, it is envisioned that two temperature sensors 114 could be employed, one for measuring the internal temperature of the power meter 102 and one for measuring the outside temperature. As another example, an infrared interface device allowing access to the controller 112 from outside the power meter 102 could be provided. Still further, the power meter 102 may include a wireless transceiver for communication with devices inside or outside the customer premises; the power meter 102 may connect to and monitor the ground wire of the standard three-wire residential current distribution system instead of just the two hot wires; and the power meter 102 may be adapted for measuring three phase power such as is commonly used for commercial premises.

The customer terminal 103 is adapted to be located within the customer premises such that a utility customer may conveniently obtain information and interact with the electric energy metering system 100. For example, a customer may use the customer terminal 103 to monitor current and past energy usage or to pay for electrical energy. The customer terminal 103 may also be used by the electric energy metering system 100 to provide warnings or notices to the customer. For example, the customer terminal may signal an alarm responsive to the power meter 102 indicating dangerous high temperature conditions; or the customer terminal may notify the customer when payment is due for electric power. The use of a customer terminal for payment of electrical energy charges is described in U.S. patent application Ser. No. 09/378,357, titled "Prepayment Energy Metering System with Two-Way Smart Card Communications," assigned to the assignee of the present invention and incorporated herein by reference in its entirety.

In the illustrated embodiment, the customer terminal 103 comprises a PLC interface 130, terminal controller 132, display 134, card reader 136, speaker 138 and keypad 140. The PLC interface 130 is connected to one of the output power lines 124 within the customer premises. It provides for communication between the customer terminal 103 and the PLC interface 120 of the power meter 102 by the use of signals modulated onto the output power lines 124. In one embodiment the PLC interface 120 is a commercially available device that complies with the American National Standards Institute (ANSI) EIA 709.2 power line communication standard. The PLC interface 130 may be wired into the electrical system of the customer premises or may be simply plugged into any electrical outlet.

The display 134 is used by the customer terminal for communicating information to the utility customer. The display 134 may be, for example, a liquid crystal display, set of light emitting diodes, a cathode ray tube, flat panel display or any other device for displaying text and/or images. The keypad 140 allows the utility customer to enter information into the customer terminal. The keypad 140 may be adapted for the input of numeric data, alphabetic data or both numeric and alphabetic data. The speaker 138 is a device capable of generating sound as is well known in the art. The speaker may be used, for example, to generate tones or synthesized voice for interactions with customers.

The card reader 136 allows data to be read from or written to a memory card, smart card or other suitable storage device. Alternatively, a passive portable storage device may be employed that would require a connector, not a reader as such A memory card is a card that contains a memory chip that can be used to store information. A smart card is a card that contains a microprocessor and memory that can store information and perform actions. In one embodiment of the present invention the card reader 136 is adapted to read and write data from a smart card only. In other embodiments the card reader 136 may read and write data to only a memory card and/or or smart card.

The card reader 136 allows data to be read from or written to a magnetic stripe card, a memory card, smart card or other suitable storage device. A magnetic stripe card is a card that has a magnetic media which can be used to store information. A memory card is a card that contains a memory chip that can be used to store information. A smart card is a card that contains a microprocessor and memory that can store information and perform actions. In one embodiment of the present invention the card reader 136 is adapted to read and write data from a smart card only. In other embodiments the card reader 136 may read and write data to only a memory card or magnetic stripe card or any combination of memory card, magnetic stripe card or smart card.

As shown, the display 134, keypad 140, card reader 136 speaker 138 and PLC interface 130 are all connected to the terminal controller 132. In one embodiment the terminal controller 132 is a general purpose microprocessor that is capable of performing actions based on input data according to preprogrammed instructions. The controller 132 may also respond to programmed instructions read by the card reader 136, entered from the keypad 140 or received over the PLC interface 130 from the power meter 102. The terminal controller 132 receives input from the card reader 136 and keypad 140 and writes data to the display 134, speaker 138 and card reader 136.

As will be appreciated by those skilled in the art, the customer terminal 103 could take many other forms. For example, the customer terminal could employ a radio interface or a dedicated wireline connection to connect to the power meter 102 rather than use the PLC interface 130. The functions of the customer terminal 103 could be integrated into or distributed among other device(s) such as, for example, a personal computer, television, home security system, thermostat, refrigerator, microwave, radio etc. The customer terminal 103 may include a microphone and be configured with a voice recognition device or software for interacting with the customer. Alternatively, the functions of the customer terminal may be implemented as a world wide web interface that can be accessed from an internet capable device such as a computer or cellular phone.

The electric energy metering system 100 is adapted to issue warnings and/or shut off power to the customer premises when the temperature of the power meter 102 increases to a level that could result in a fire. Unsafe temperature conditions may be caused, for example, by excessive power flow through the power meter 102, a malfunction of the power meter 102, excessive outside temperature, a malfunction of a socket into which the power meter 102 is installed or a combination of reasons. Generally, the power meter controller 112 performs various actions responsive to the output of the temperature sensor 114. In one embodiment, for example, the controller 112 issues warnings and shuts off the electric power, as appropriate, when the temperature from the temperature sensor 114 crosses certain defined temperature thresholds.

Figure 2:
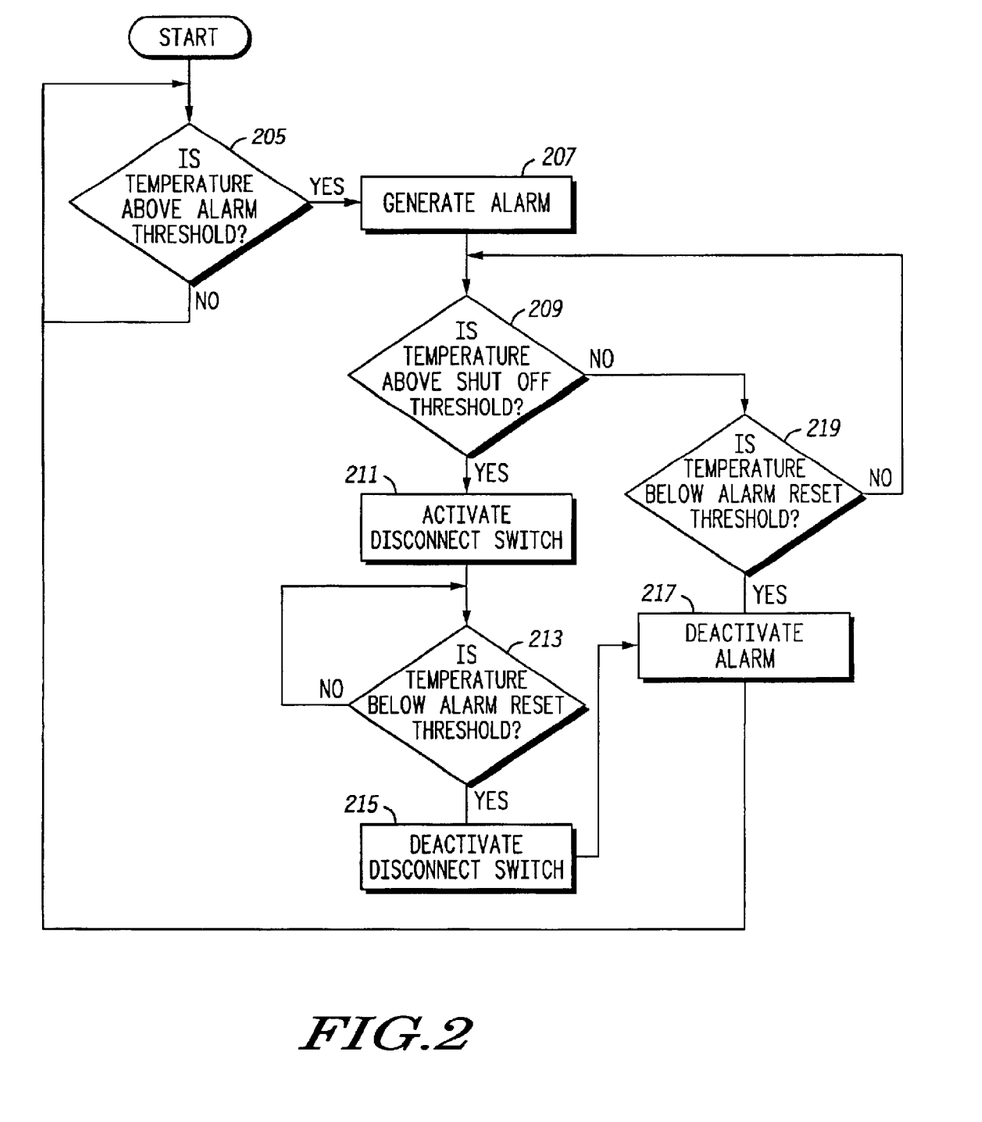
FIG. 2 is a flow chart showing a method for an electric energy metering system to generate alarms and/or disconnect power based on temperature.

FIG. 2 shows an exemplary process by which the electric energy metering system 100 generates alarms and/or disconnects power based on temperature of the power meter 102. The process presumes that the controller 112 monitors the power meter temperature based on temperature reported from the temperature sensor 114. The temperature sensor 114 may report the power meter temperature either continuously or periodically. The controller 112 compares the power meter temperature to various decision thresholds. In one embodiment, as best observed in FIG. 3, the decision thresholds include an alarm threshold 307, a shut off threshold 309 and an alarm reset threshold 305. As will be appreciated, the alarm threshold 307, a shut off threshold 309 and alarm reset threshold 305 may vary according to regulatory requirements, operating environments, and the like. For convenience, the flowchart of FIG. 2 will be described with reference to the temperature curve 303 shown in FIG. 3.

At step 205, the controller 112 compares the power meter temperature to the alarm threshold 307 to determine whether it is above the alarm threshold 307. Generally, the alarm threshold 307 corresponds to a power meter temperature that is sufficiently higher than a nominal temperature to define a hazardous condition, the presence of which the customer should be warned by an alarm. Until such time as the power meter temperature exceeds the alarm threshold, no action is taken and step 205 is repeated to compare further reported temperatures to the alarm threshold 307. For example, with reference to FIG. 3, suppose an initial reported temperature of the power meter corresponds to reference point 350 (i.e., below the alarm threshold 307). In such case, the controller 112 will take no action other than to continue monitoring the power meter temperature until it exceeds the alarm threshold 307.

Figure 3:
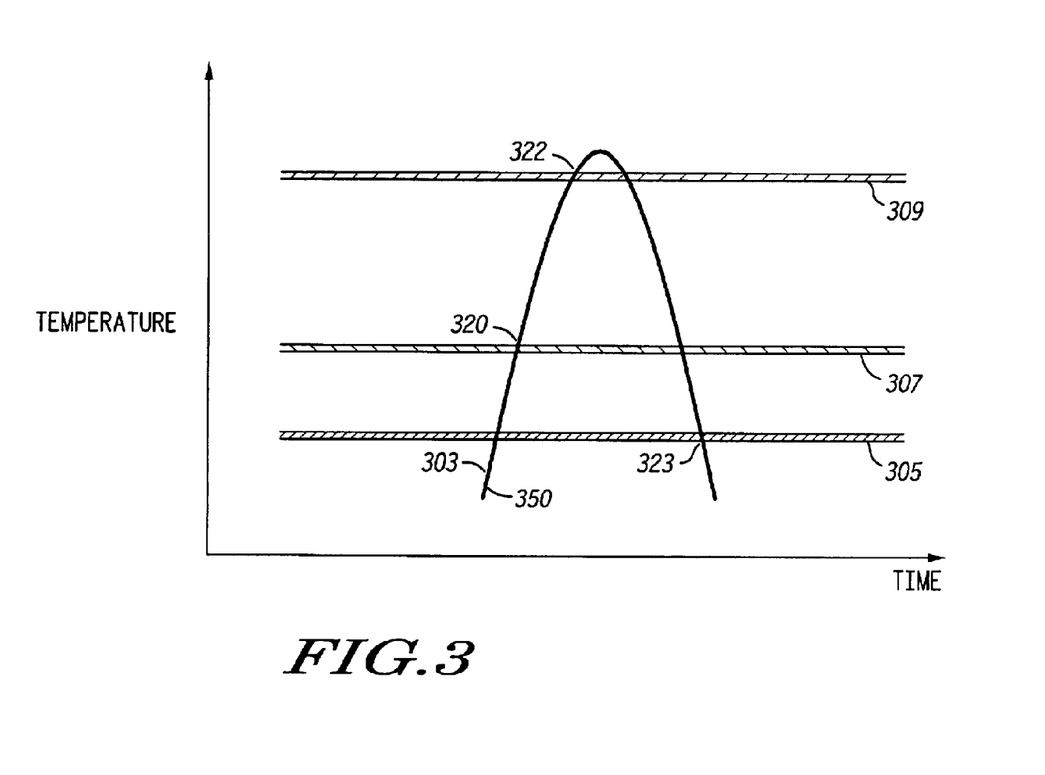
FIG. 3 is diagram showing a plot of temperature as it relates to various decision thresholds according to one embodiment of the present invention.

Once the power meter temperature exceeds the alarm threshold, if at all (e.g., at reference point 320), the process proceeds to step 207 to generate an alarm. In one embodiment, the alarm comprises an audible and/or textual warning communicated to a utility customer via the customer terminal 103 (FIG. 1). The alarm may be sent by the controller 112 to the customer terminal 103 using the PLC interface 120.

Having generated an alarm, the controller at step 209 continues to monitor the power meter temperature to determine if it ever exceeds the shut off threshold 309. Generally, the shut off threshold 300 corresponds to a power meter temperature that is even higher than the alarm threshold temperature, the occurrence of which is sufficiently dangerous to necessitate shutting off power from the customer premises. Accordingly, if the temperature is above the shutoff threshold, a power disconnect switch is activated at step 211 to shut off the customer's power. For example, with reference to FIG. 3, the controller 112 will activate the disconnect switch upon the reported temperature of the power meter reaching reference point 322.

Having activated the disconnect switch, the controller at step 213 continues to monitor the power meter temperature to determine if it ever falls below the alarm reset threshold 305. Generally, the disconnection of electrical power to the premises will cause the power meter temperature to decrease. The alarm reset threshold 305 corresponds to a power meter temperature that is sufficiently decreased from the shut off threshold and alarm threshold temperatures that any previous alarms may be shut off and the power restored. Until such time as the power meter temperature falls below the alarm reset threshold, the alarm condition and power shut off condition remain and step 213 is repeated to compare further reported temperatures to the alarm reset threshold 305. For example, with reference to FIG. 3, the alarm condition and shut off condition will remain until such time as the reported temperature of the power meter corresponds to reference point 323 (i.e., below the alarm reset threshold 305).

Once the power meter temperature falls below the alarm reset threshold, if at all (e.g., at reference point 323), the process proceeds to steps 215 and 217 to restore power to the customer and to de-active any previous alarms; and the process returns to step 205 to again compare the reported power meter temperatures to the alarm threshold 307, substantially as previously described.

If, at step 209, the power meter temperature is determined not to exceed the shut off threshold (i.e., the power meter temperature is somewhere between the alarm and shut off thresholds), the controller at step 219 continues to monitor the power meter temperature to determine if it ever falls below the alarm reset threshold 305. Once the power meter temperature falls below the alarm reset threshold, if at all (e.g., at reference point 323), the process proceeds to step 217 to de-active any previous alarms; and the process returns to step 205 to again compare the reported power meter temperatures to the alarm threshold 307, substantially as previously described. Otherwise, until such time as the power meter temperature is determined at step 219 to fall below the alarm reset threshold, the alarm condition remains and step 209 is repeated to compare further reported temperatures to the shut off threshold 309.

Figure 4:
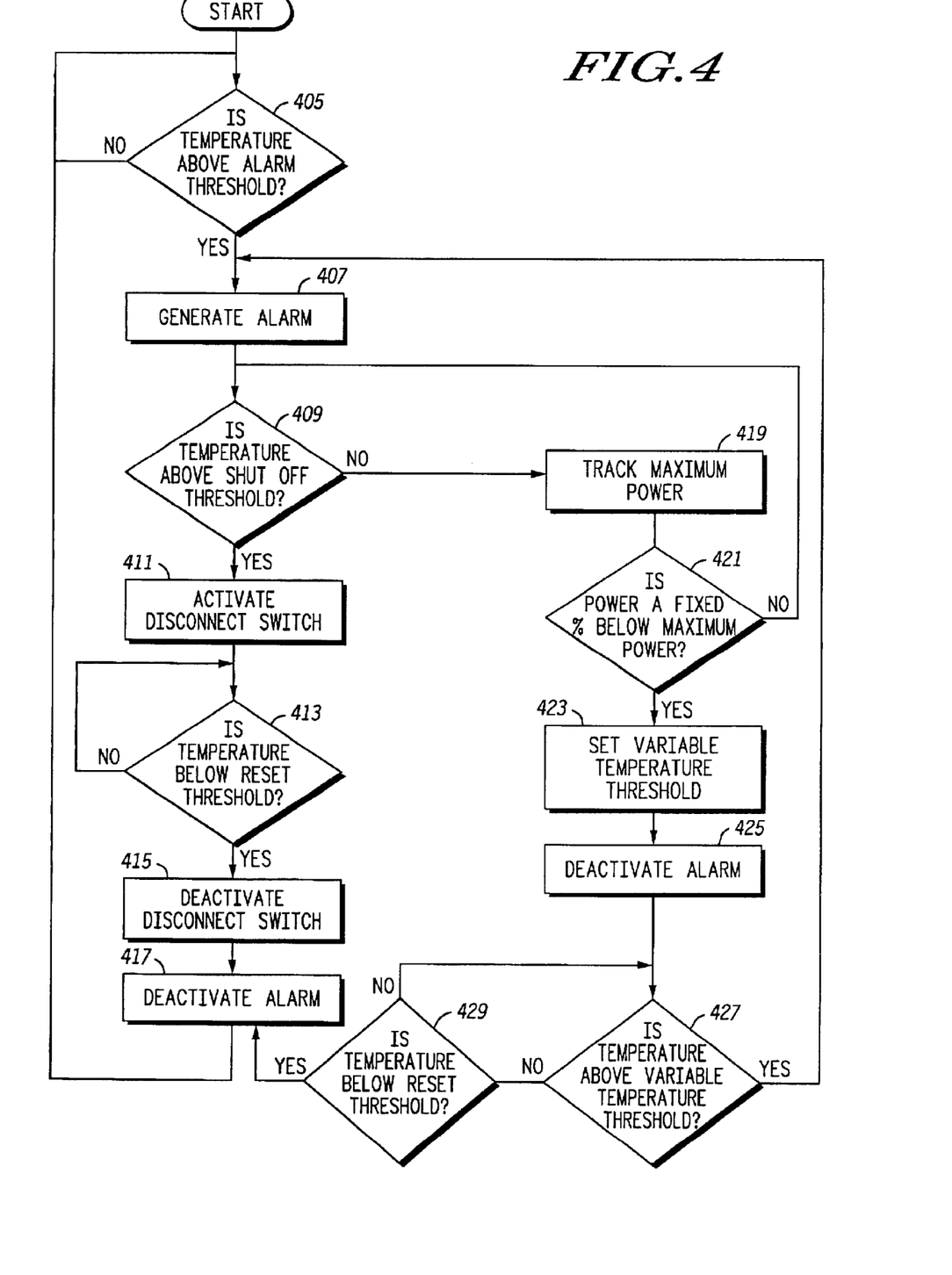
FIG. 4 is a flow chart showing another method for an electric energy metering system to generate alarms and/or disconnect power based on temperature.

FIG. 4 shows a second embodiment of a process by which the electric energy metering system 100 generates alarms and/or disconnects power based on temperature of the power meter 102. As with the process of FIG. 2, the process presumes that the controller 112 monitors the power meter temperature based on temperature reported from the temperature sensor 114, and the controller 112 compares the power meter temperature to various decision thresholds. As best observed in FIG. 5, the decision thresholds in the second embodiment include an alarm threshold 507, a variable alarm threshold 508, a shut off threshold 509 and an alarm reset threshold 505. The alarm threshold 507, shut off threshold 509 and alarm reset threshold 505 correspond substantially to the alarm threshold 307, shut off threshold 309 and alarm reset threshold 305 described in relation to FIG. 3. The variable alarm threshold 508 is set after the temperature has risen above the alarm threshold 507 and is related to the maximum instantaneous power. The variable alarm threshold will be described in greater detail in relation to FIG. 4. For convenience, the flowchart of FIG. 4 will be described with reference to the temperature curve 503 shown in FIG. 5.

At step 405, the controller 112 compares the power meter temperature to the alarm threshold 507 to determine whether it is above the alarm threshold 507. Until such time as the power meter temperature exceeds the alarm threshold, no action is taken and step 405 is repeated to compare further reported temperatures to the alarm threshold 507. For example, with reference to FIG. 5, suppose an initial reported temperature of the power meter corresponds to reference point 550 (i.e., below the alarm threshold 507). In such case, the controller 112 will take no action other than to continue monitoring the power meter temperature until it exceeds the alarm threshold 507.

Figure 5:
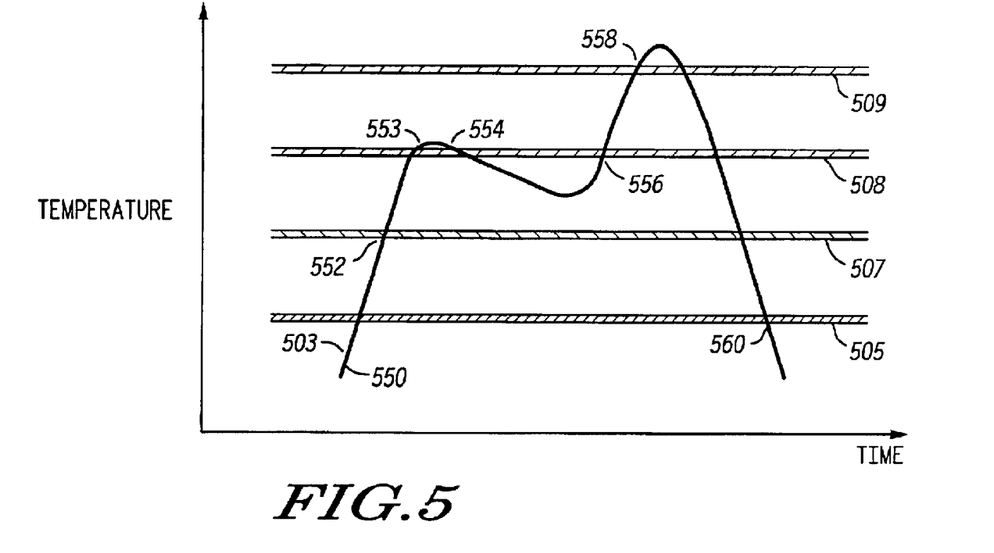
FIG. 5 is a diagram showing a plot of temperature at it relates to various decision thresholds according to one embodiment of the present invention.

Once the power meter temperature exceeds the alarm threshold, if at all (e.g., at reference point 552), the process proceeds to step 407 to generate an alarm. In one embodiment, the alarm comprises an audible and/or textual warning communicated to a utility customer via the customer terminal 103 (FIG. 1). The alarm may be sent by the controller 112 to the customer terminal 103 using the PLC interface 120.

Having generated an alarm, the controller at step 409 continues to monitor the power meter temperature to determine if it ever exceeds the shut off threshold 509. If the temperature is above the shutoff threshold, a power disconnect switch is activated at step 411 to shut off the customer's power. For example, with reference to FIG. 5, the controller 112 will activate the disconnect switch upon the reported temperature of the power meter reaching reference point 558.

Having activated the disconnect switch, the controller at step 413 continues to monitor the power meter temperature to determine if it ever falls below the alarm reset threshold 505. Until such time as the power meter temperature falls below the alarm reset threshold 505, the alarm condition and power shut off condition remain and step 413 is repeated to compare further reported temperatures to the alarm reset threshold 505. For example, with reference to FIG. 5, the alarm condition and shut off condition will remain until such time as the reported temperature of the power meter corresponds to reference point 560 (i.e., below the alarm reset threshold 505).

Once the power meter temperature falls below the alarm reset threshold, if at all (e.g., at reference point 560), the process proceeds to steps 415 and 417 to restore power to the customer and to de-active any previous alarms; and the process returns to step 405 to again compare the reported power meter temperatures to the alarm threshold 507, substantially as previously described.

If, at step 409, the power meter temperature is determined not to exceed the shut off threshold (i.e., the power meter temperature is somewhere between the alarm and shut off thresholds), the controller at step 419 determines a maximum instantaneous power value associated with the power meter 102. In one embodiment, the controller 112 monitors the instantaneous power based on information reported from the power measurement sensor 108 when the temperature is above the alarm threshold. As shown in FIG. 5, the power meter temperature rises to a peak at reference point 553 and begins to decrease. For example, the temperature may decrease when a customer, responsive to the alarm generated at the alarm threshold, takes some action to reduce the temperature. The maximum instantaneous power comprises the instantaneous power passing through the power meter 102 at the peak of the temperature curve (i.e., at reference point 553). Next, at step 421, a check is made to see if the instantaneous power has dropped a fixed percentage below the maximum instantaneous power. In one embodiment, for example, the fixed percentage comprises a 20% drop, such that the instantaneous power is 80% of the maximum instantaneous power. In FIG. 5, reference point 554 represents the power meter temperature coincident to a 20% drop from the maximum instantaneous power. As will be appreciated, other percentages could also be used. Until such time as the instantaneous power has not dropped the fixed percentage below the maximum instantaneous power, the controller continues at step 409 to compare the power meter temperature to the shutoff threshold, as has been described.

At step 421, if the instantaneous power is determined to have dropped the fixed percentage below the maximum instantaneous power, the variable alarm threshold 508 is determined at step 423. In one embodiment, the variable alarm threshold 508 is set to the present temperature of the power meter at the point the instantaneous power drops the fixed percentage below the maximum instantaneous power (e.g., at reference point 554). Then, at step 425 the alarm is deactivated. A check is then made at step 427 to see if the temperature is above the variable alarm threshold. If the temperature is not above the variable alarm threshold, a check is made at step 429 to see if the temperature is below the alarm reset threshold. If the temperature is below the alarm reset threshold, the alarm is deactivated at step 417. However, at step 429 if the alarm is not below the alarm reset threshold, another check to see if the temperature is above the variable alarm threshold is made at step 427. If at step 427 the temperature is above the variable temperature threshold, an alarm is generated at step 407. Thus, in the event the alarm generated in response to the power meter temperature exceeding the alarm threshold 507 is shut off (e.g., at reference point 554), the alarm is re-activated if the temperature rises above the variable alarm threshold 508.

In addition to shutting off the flow of electrical power due to unsafe temperature conditions, the electric energy metering system 100 may shut off power for other reasons. For example, the power may be shut off for non-payment of the cost of electrical power. One example of an electrical energy metering system that may shut off electrical power for non-payment of energy cost is given in related patent application Ser. No. 09/378,357, incorporated herein by reference in its entirety. In the related application, customers pay for electrical power before they use it by inserting a smart card containing monetary credit into a customer terminal. If the customer does not pre-pay for power, the electric energy metering system may shut off power to the customer premises. Of course, the customer terminal may attempt to warn the customer of the need for payment before power is disconnected. The electric energy metering system 100 may similarly be used as a prepayment electrical metering system as described in the related application. The electric energy metering system 100 may also be used as a post-payment system. For example, as a post-payment system, the electric energy metering system will keep track of electrical energy use for a predefined period (such as a month, for example) and notify the customer through the customer terminal 103 what payment is due. The customer can then make payment at the customer terminal 103 using a smart card. If the customer does not make payment before a deadline, the electric energy metering system will disconnect electrical power to the customer premises.

Some regulatory agencies governing the utility industry or government entities such as state or local governments have rules governing when electrical power may be disconnected. As an example, power disconnection may be forbidden when the average daily temperature or the nighttime temperature is below a certain level and/or power disconnection may be forbidden at certain times of year (e.g., during the winter months). Other factors such as medical needs or income level of the customer may also be considered when determining the rules for disconnecting electrical power from a customer. The electrical energy metering system 100 of FIG. 1 is operable to test these criteria before electrical power is disconnected. For example, the controller 112 can use temperature information from the temperature sensor 114 to estimate the outside temperature, can also track the time of day and date, or determine whether it is day or night by using the photo sensor 116.

It should be noted that the temperature measured by the temperature sensor 114 is a function of the outside temperature and power flowing through the power meter 102. However, the controller 112 can estimate the amount of heat produced by the power flowing through the power meter 102 and use this to correct the temperature from the temperature sensor 114 to estimate the outside temperature. Alternatively, the power meter 102 may contain two temperature sensors, one internal temperature sensor for measuring the heat within the device and the other one, located on or near the outside of the power meter 102, for measuring the outside temperature.

The criteria for disconnection of power may change over time because of changes in regulation or laws. The electric energy metering system 100 is able to adapt to these changes. The electric energy metering system 100 can receive notification of the changes by way of a smart card used for payment of energy charges. In one embodiment of the present invention, as explained in related patent application Ser. No. 09/378,357, monetary credits are placed onto the smart card at fully automatic point-of-sale (POS) terminals or at utility customer service centers. When the smart card is loaded with monetary credit, it can also receive instructions for reprogramming the electric metering system 100 to use a different set of criteria for determining when power disconnection may be performed. When the smart card is inserted into the customer terminal 103, these instructions are conveyed to the electric energy metering system 100. In alternate embodiments, the electric energy metering system 100 may have other methods for receiving updated criteria for the disconnection of power. For example, the electric energy metering system may have a telephone modem, wireless radio frequency transmitter/receiver, or a connection to the internet by which updated criteria can be received.

Figure 6:
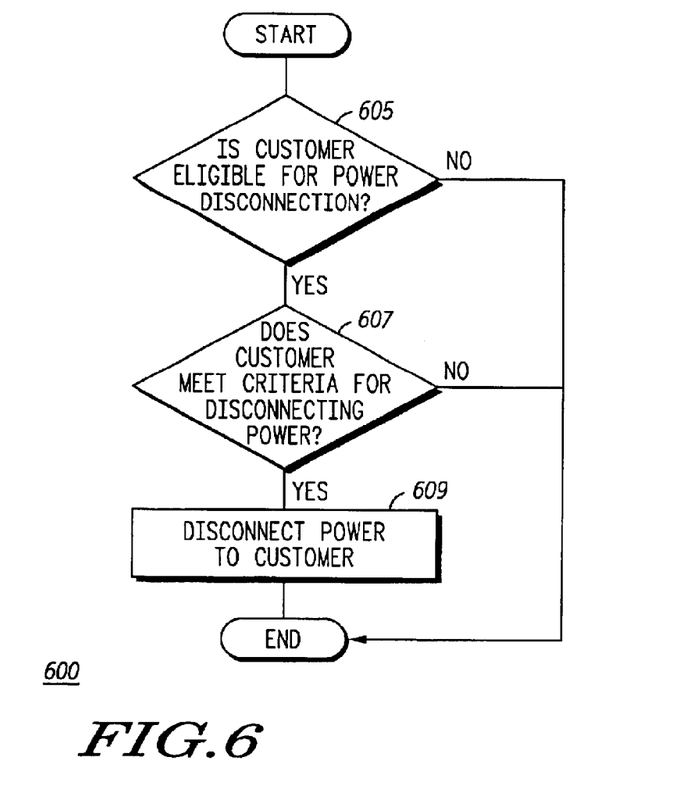
FIG. 6 is a flow chart showing a method for disconnection of power when a utility customer meets a set of criteria.

There is shown in FIG. 6 a flow chart for a method for an electric energy metering system to determine when to disconnect electrical power to a customer premises. At step 605, the electric energy metering system determines whether a customer is eligible for electrical power disconnection under a primary criteria. This could occur, for example, if the customer fails to pay for electrical power. If the customer is not eligible for power disconnection under the primary criteria, the process ends. If the customer is eligible for power disconnection under the primary criteria, at step 607 the electric energy metering system 100 determines if a secondary criteria for disconnecting the electrical power to the customer premises has been met. The secondary criteria could be based on rules from a regulatory agency, state or local law or by the policy of the electric utility. The secondary criteria could be based on, for example, the date, the time of day, the outdoor temperature, whether it was day or night, the medical needs of the customer, the income level of the customer or the customers past record of payment. As will be appreciated, the primary and secondary criteria may be interchanged. For example, time of day could be used as a primary criteria and non-payment of electrical bills a secondary criteria, and so forth. If both the primary and secondary criteria have been met, then at step 609, the power to the customer premises is disconnected.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A power meter comprising:

a temperature sensor;

a power disconnect switch; and a controller operable to monitor the power meter temperature based on input from the temperature sensor, compare the power meter temperature to a shutoff threshold; and activate the power disconnect switch if the power meter temperature exceeds the shutoff threshold.

2. The power meter of claim 1 wherein the controller is further operable to compare the power meter temperature to an alarm threshold, the alarm threshold being less than the shutoff threshold; and generate an alarm if the power meter temperature exceeds the alarm threshold.

3. In combination, the power meter of claim 2 and a customer terminal, the customer terminal being adapted to notify a customer of the alarm if the power meter temperature exceeds the alarm threshold, the customer terminal comprising:

a terminal controller;

a display; and a terminal communications interface electrically coupled to the terminal controller, the terminal communications interface being operable to exchange data with the power meter over a power line carrier.

4. The power meter of claim 1 wherein the controller is further operable to activate the power disconnect switch for non-payment of electricity cost.

5. The power meter of claim 4 wherein the controller is inhibited from activating the power disconnect switch for non-payment of electricity cost below a certain outdoor temperature.

6. The power meter of claim 4 wherein the controller is inhibited from activating the power disconnect switch for non-payment of electricity cost on certain dates.

7. The power meter of claim 4, further comprising a photo sensor for determining a level of ambient light outside of the power meter, the controller being inhibited from activating the power disconnect switch for non-payment of electricity cost below a certain level of ambient light outside of the power meter.

8. In an electric energy metering system including a power meter having a temperature sensor, a controller, and a power disconnect switch, a method comprising the controller performing steps of:

monitoring a power meter temperature reported to the controller from the temperature sensor;

comparing the power meter temperature to a shutoff threshold; and activating the power disconnect switch if the power meter temperature exceeds the shutoff threshold.

9. The method of claim 8 further comprising the step of:

comparing the power meter temperature to an alarm threshold, the alarm threshold being less than the shutoff threshold; and generating an alarm if the power meter temperature exceeds the alarm threshold, thereby defining an alarm condition.

10. The method of claim 9 wherein the electric energy metering system includes a customer terminal, the step of generating an alarm comprising alerting a customer of the alarm condition via the customer terminal.

11. The method of claim 9 further comprising:

when in the alarm condition, comparing the power meter temperature to an alarm reset threshold, the alarm reset threshold being less than the alarm threshold; and deactivating the alarm, thereby defining a deactivated alarm condition, if the power meter temperature falls below the alarm reset threshold.

12. The method of claim 11 wherein the electric energy metering system includes a customer terminal, the step of deactivating the alarm comprising notifying a customer of the deactivated alarm condition via the customer terminal.

13. The method of claim 9, wherein the power meter includes a power measurement sensor, the method comprising:

when in the alarm condition, monitoring instantaneous power measured by the power measurement sensor;

determining a maximum instantaneous power measured by the power measurement sensor; and if the instantaneous power falls a fixed percentage below the maximum instantaneous power, deactivating the alarm, thereby defining a deactivated alarm condition.

14. The method of claim 9, wherein the power meter includes a power measurement sensor, the method comprising:

when in the alarm condition, monitoring instantaneous power measured by the power measurement sensor;

determining a maximum instantaneous power measured by the power measurement sensor;

if the instantaneous power falls a fixed percentage below the maximum instantaneous power, deactivating the alarm, thereby defining a deactivated alarm condition; and setting a variable alarm threshold, the variable alarm threshold corresponding to the power meter temperature when the instantaneous power has fallen the fixed percentage below the maximum instantaneous power; and when in the deactivated alarm condition, comparing the power meter temperature to the variable alarm threshold; and re-activating the alarm, thereby defining a re-activated alarm condition, if the power meter temperature rises above the variable alarm reset threshold.

\* \* \* \* \*